US010113573B2

(12) United States Patent
Kemp et al.

(10) Patent No.: US 10,113,573 B2
(45) Date of Patent: Oct. 30, 2018

(54) SEQUENCING LOCKING MECHANISM FOR TELESCOGING STRUCTURES

(71) Applicant: Raytheon Company, Waltham, MA (US)

(72) Inventors: Steven P. Kemp, Boxborough, MA (US); Gary E. Marcelynas, Sudbury, MA (US); Gregory S. Renaud, Dracut, MA (US); Sarah L. Palmer, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 427 days.

(21) Appl. No.: 14/933,979

(22) Filed: Nov. 5, 2015

(65) Prior Publication Data

US 2017/0130753 A1    May 11, 2017

(51) Int. Cl.
*E04H 12/18* (2006.01)
*F16B 7/10* (2006.01)

(52) U.S. Cl.
CPC ............ *F16B 7/105* (2013.01); *E04H 12/182* (2013.01); *Y10T 403/32467* (2015.01); *Y10T 403/32524* (2015.01)

(58) Field of Classification Search
CPC ..... Y10T 403/32467; Y10T 403/32524; Y10T 403/7077; F16B 7/10; F16B 7/105; F16B 7/22; E04H 12/182
See application file for complete search history.

(56) References Cited

U.S. PATENT DOCUMENTS

| | | | | | |
|---|---|---|---|---|---|
| 3,280,439 | A | * | 10/1966 | McCarthy | F16B 21/10 24/613 |
| 4,357,785 | A | * | 11/1982 | Eklund | E04H 12/182 212/350 |
| 4,793,204 | A | * | 12/1988 | Kubasiak | B62D 1/184 280/775 |
| 8,413,390 | B2 | * | 4/2013 | Pereira | E04H 12/00 343/883 |
| 8,549,812 | B1 | * | 10/2013 | Peng | E04B 1/34305 212/348 |
| 9,463,125 | B2 | * | 10/2016 | Panzer | A61G 7/012 |
| 9,670,948 | B1 | * | 6/2017 | Wasson | E04H 12/182 |
| 2008/0099654 | A1 | * | 5/2008 | Bailly | B66C 23/707 248/644 |
| 2015/0290058 | A1 | * | 10/2015 | Panzer | B66F 3/28 403/109.6 |

FOREIGN PATENT DOCUMENTS

FR    2422792 A1 * 11/1979 .......... E04H 12/182
FR    2446907 A1 *  8/1980 .......... E04H 12/182

* cited by examiner

*Primary Examiner* — Jonathan P Masinick (57) ABSTRACT

A passive locking mechanism for a telescoping structure includes a stud fixed to a first panel section, a lower pawl coupled to a second panel section, an upper pawl coupled to the second panel section operable to engage the lower pawl, and a lock wedge coupled to a third panel section. The lock wedge is operable to engage the upper and lower pawls. In a retracted position of the telescoping structure, the lower pawl is engaged with the lock wedge, such that the second panel section is locked in place relative to the third panel section, and the first panel section is free to move relative to the second panel section.

17 Claims, 9 Drawing Sheets

SEQUENCING LOCKING MECHANISM FOR TELESCOGING STRUCTURES

BACKGROUND

The present invention relates generally to locking mechanisms including systems and methods related thereto, and particularly locking mechanisms for use with telescoping structures having mast segments or sections that extend and retract. Telescoping structures that extend and retract can operate under less than ideal conditions. For example, the mast sections can, in some circumstances, raise and lower out of sequence, potentially causing instability within the structure. This may occur during operation on ground that is uneven or not level, or in high wind situations. Out of sequence operation of the telescoping structure can cause one or more of the sections to fall due to insufficient support of the sections, thus creating large impact forces that can affect the performance of the telescoping structure or the object it supports. In worst case scenarios, damage can occur to the telescoping structure or the supported object.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Telescoping structures of various types include a series of sections that nest within themselves. One telescoping function can be demonstrated or provided when the sections of a telescoping structure are extended from the nested group of sections to a fully or partially raised or extended position or configuration. A retraction function can operate to bring the sections back to a partial or fully nested position or configuration. A telescoping structure can be tubular in shape, but can also take many other forms. Telescoping structures can be cable driven in design. For example, one cable can be used to position the various sections of the structure into an extended condition and another cable can be used to move and position the various section of the structure back into a retracted condition. A series of pulleys and passageways in one or more of the panel sections can be used in conjunction with the cables to provide interaction with the panel sections and facilitate operation.

The extension order of the telescoping sections is generally desired to be in sequence (e.g., smallest to largest with the innermost section being the smallest and each successive nested section being larger in size, etc.) for a vertical structure for moving from a fully retracted condition to an extended condition. Similarly, the retraction order of the telescoping sections is also generally desired to be in sequence (e.g., from the largest to smallest, or generally from the outside in). If the telescoping structure is raised or lowered in good conditions, such as on naturally level ground in a vertical orientation, proper sequencing is more likely to occur with smooth operation. However, it is possible that the telescoping structure can be operated in less than ideal situations or conditions that can cause less than smooth or improper operation. For instance, when installed or operational on a slope or incline, frictional forces can overcome gravity, thus causing out of order or out of sequence telescoping/retraction. For example, an upper section can be caused to move out of sequence before one or more lower sections are fully retracted, which can allow the remaining larger sections to fall and slam into one another once the friction forces are overcome. Of course, this is not to be considered limiting. Indeed, those skilled in the art will recognize other operational conditions/scenarios in which less than optimal or improper telescoping/retraction sequencing of the sections of a telescoping structure can occur. Those skilled in the art will also recognize that design issues, installation issues, maintenance issues, etc. of telescoping structures, such as variations in overlap distances, friction, initial fit, etc., can affect sequencing.

Figure 1A:
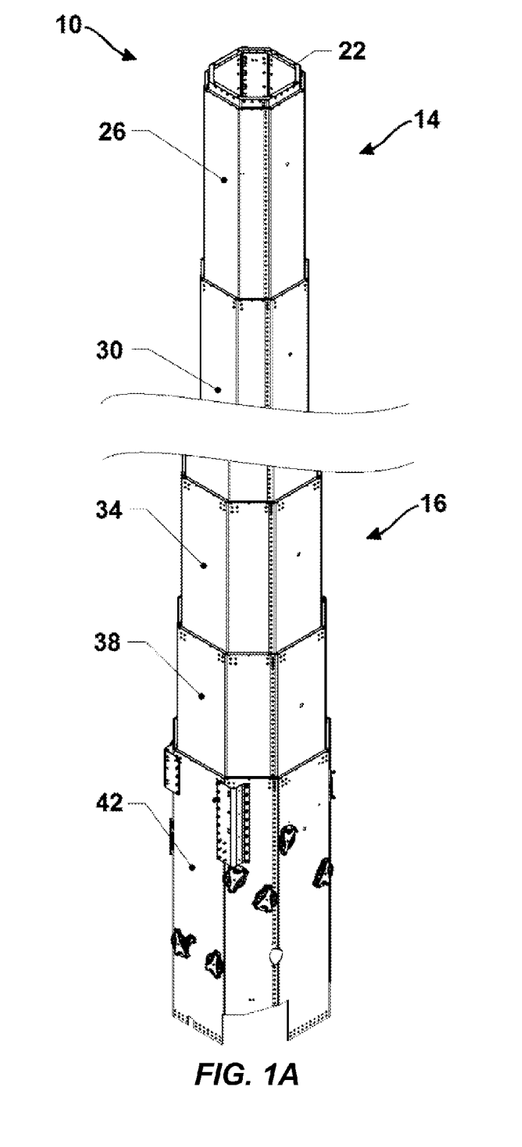
FIG. 1A is a perspective view of an example of a telescoping structure shown in a separated schematic in full extension that can be used with a locking mechanism according to the present disclosure.
Figure 1B:
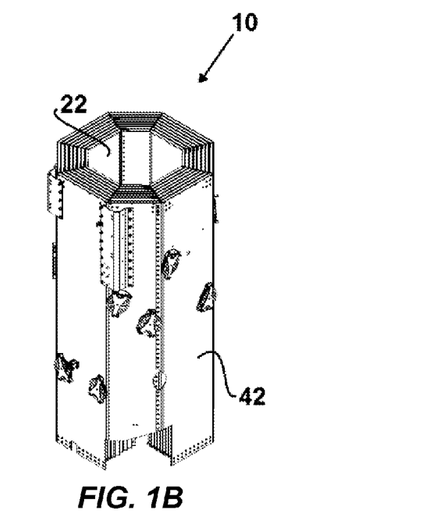
FIG. 1B is a perspective view of an example of a telescoping structure shown fully retracted that can be used with a locking mechanism according to the present disclosure.
Figure 1C:
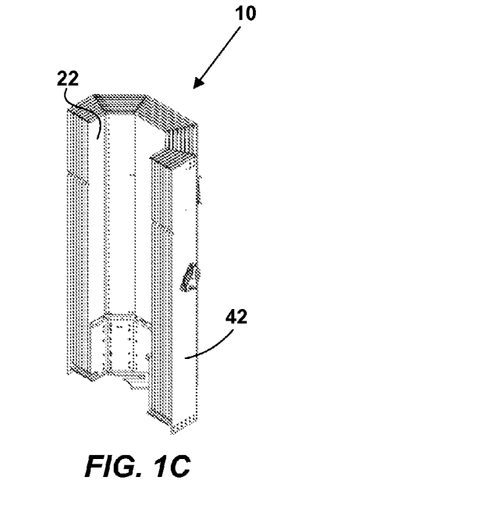
FIG. 1C is a perspective cutaway section view of the telescoping structure of FIG. 1B.

FIGS. 1A-1C illustrate one example of a telescoping structure in the form of a mast telescoping structure, such as those for use with surveillance cameras, microwave antennas, or other devices needing an improved field of view by elevating the device. In the embodiment shown, the telescoping structure 10 can be operable with and comprise a locking mechanism as described herein. FIG. 1A shows the telescoping structure 10 as having upper telescoping sections 14 including the first section 22, which is the innermost section, as well as a second section 26, which generally surrounds and nests with the first section 22. A third section 30 is shown followed by a break in the figure for illustration. A seventh section 34 is shown under the break in the figure followed by an eighth section 38, and a final, outermost, ninth section 42 at the base of the telescoping structure 10. FIGS. 1B and 1C show the telescoping structure 10 in a fully retracted, stowed condition, with each of the various sections, including the innermost, first section 22 and the outermost, ninth section 42, in an orderly, nested configuration with one another.

As further described herein, a locking mechanism can facilitate control of the order of extension and retraction of the various sections of a telescoping structure, such as the telescoping structure 10, such that these are extended/retracted in a designated sequence. Referring generally to FIGS. 2-9, an example of a passive locking mechanism 100 for a telescoping structure comprising at least three panel sections includes a stud 102 coupled to or otherwise located about a first panel section 104, a lower pawl 106 pivotally coupled to or otherwise located about a second panel section 108, an upper pawl 110 pivotally coupled to or otherwise located about the second panel section 108, and a lock wedge 114 coupled to or otherwise located about a third panel section 112. The upper pawl 110 is operable to engage the lower pawl 106, and the lock wedge 114 is operable to engage the upper and lower pawls 110, 106, as described in more detail below. The upper pawl 110 and the lower pawl 106 are biased toward engagement with the lock wedge 114. This biasing can be achieved, for example, with a torsion spring. However, other biasing systems and devices are contemplated and can be used as will be recognized by those skilled in the art.

The lower pawl 106 can include a slot portion 134 operable to receive and engage the stud 102, and a latch portion 135 operable to engage the upper pawl 110 and the lock wedge 114. The slot portion 134 can comprise a closed end 136 and an open end 138. The slot portion 134 can be defined by a first wall portion 142 and a second wall portion 144. The first and second wall portions 142, 144 can comprise the same or different lengths. In one example, the first wall portion 142 can comprise a shorter length than the second wall portion 144, thus allowing the lower pawl 106 to be initially positioned such that the slot portion 134 comprises a longitudinal axis non-parallel to an axis of movement of the stud 102. Employing this configuration permits the stud 102 to move past the lower wall portion 142 and contact the upper wall portion 144, thereby moving into to the slot portion 134 upon the relative movement of the adjacent first and second panel sections 104 and 108 (see FIGS. 5A and 5B showing the stud 102 as clearing the shorter first wall portion 142 and being set to contact the second wall portion 144, while being caused to be positioned within the slot portion 134 as the first panel section 104 is raised relative to the second panel section 108).

At least a portion of the lower pawl 106 can be designed to extend through a passageway 109 (shown for example in FIG. 3) formed in the second panel 108. In the example shown, the lower pawl 106 can comprise a latch portion 135 extending away from the slot portion 134. In this configuration, the slot portion 134 can be located between the first panel section 104 and the second panel section 108, with the latch portion 135 extending through the passageway 109 in the second panel section 108. Rotation or pivoting of the lower pawl 106 can cause the latch portion to move back and forth within the passageway 109 in the second panel section 108.

Figure 2:
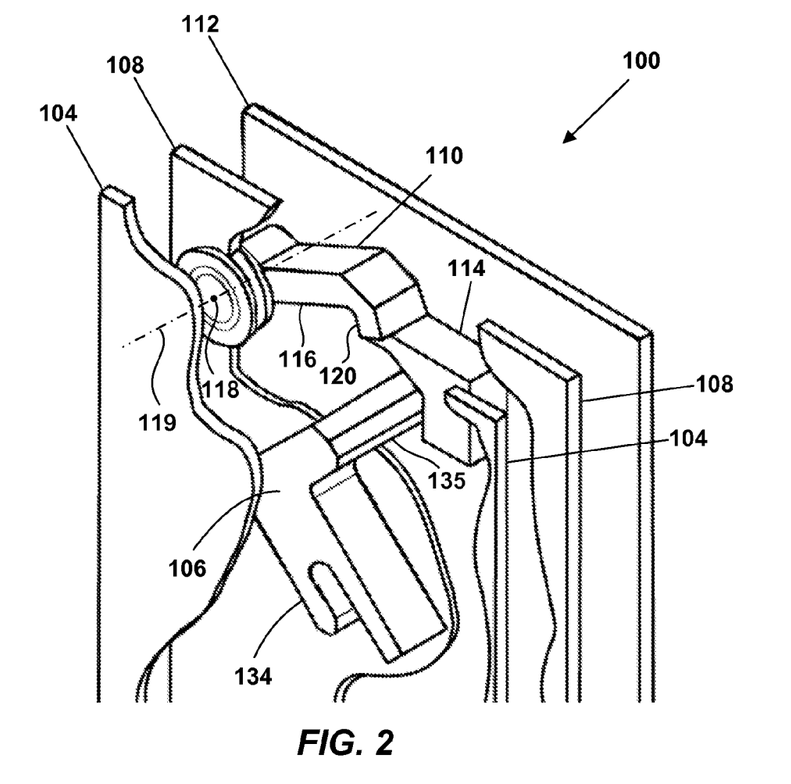
FIG. 2 is a perspective cutaway section view of a portion of an example of a locking mechanism according to the present disclosure in a fully retracted condition.
Figure 3:
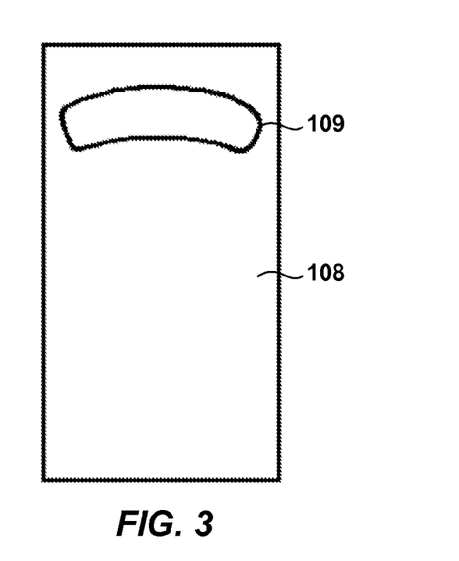
FIG. 3 is a front view of an example of a panel section having a passageway according to the present disclosure.
Figure 4A:
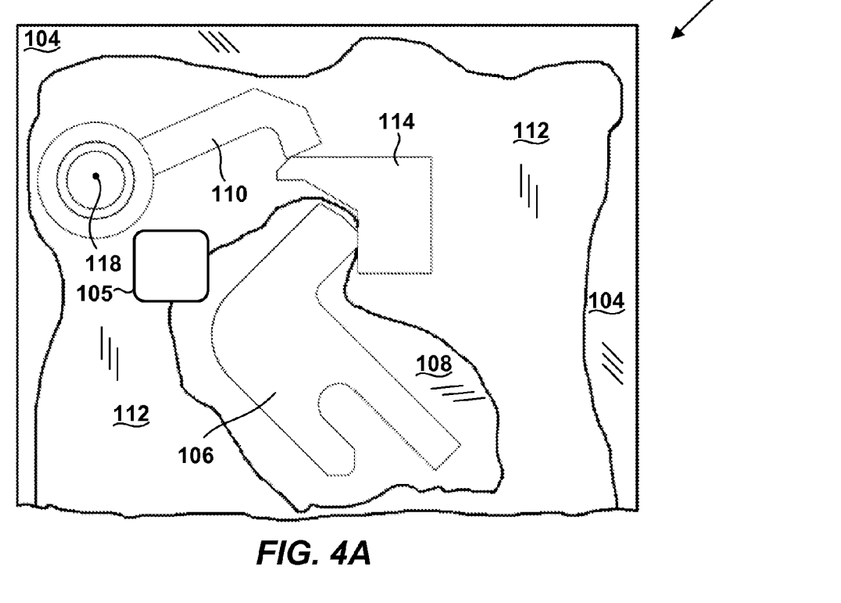
FIG. 4A is a front cutaway section view of a portion of an example of a locking mechanism according to the present disclosure in a fully retracted condition.
Figure 4B:
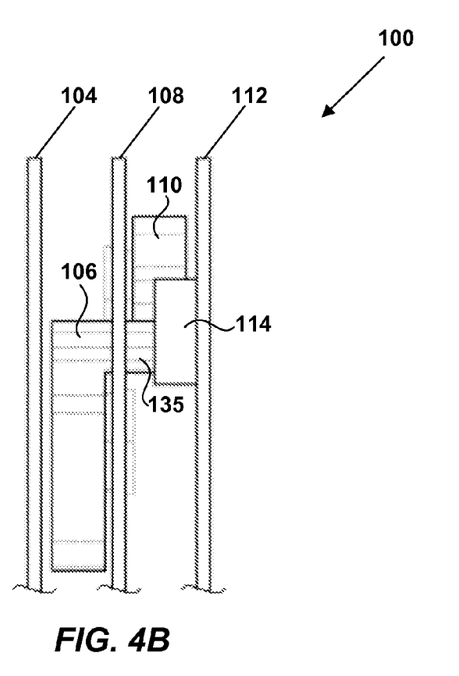
FIG. 4B is a right side view of the locking mechanism of FIG. 4A.

FIGS. 2, 4A, and 4B, with continued reference to FIGS. 2-9, depict a retracted position of the telescoping structure. In the retracted position (including positions of the first panel section 104 relative to the second panel section 108 up until the engagement of the stud 102 with the lower pawl 106), the latch portion 135 of the lower pawl 106 is engaged with the lock wedge 114, such that the second panel section 108 is locked in place relative to the third panel section 112. In addition, the upper pawl 110 is engaged with the lock wedge 114, thus preventing rotation of the upper pawl 110. As so configured, the locking mechanism 100 can facilitate the first panel section 104 being free to move relative to the second panel section 108, thus initiating ordered, sequential movement within the telescoping structure by limiting movement only to the first panel section 104. In other words, actuation of the telescoping structure to extend the various panel sections will result in the first panel section 104 moving first, with the others being temporarily locked in place.

Figure 5A:
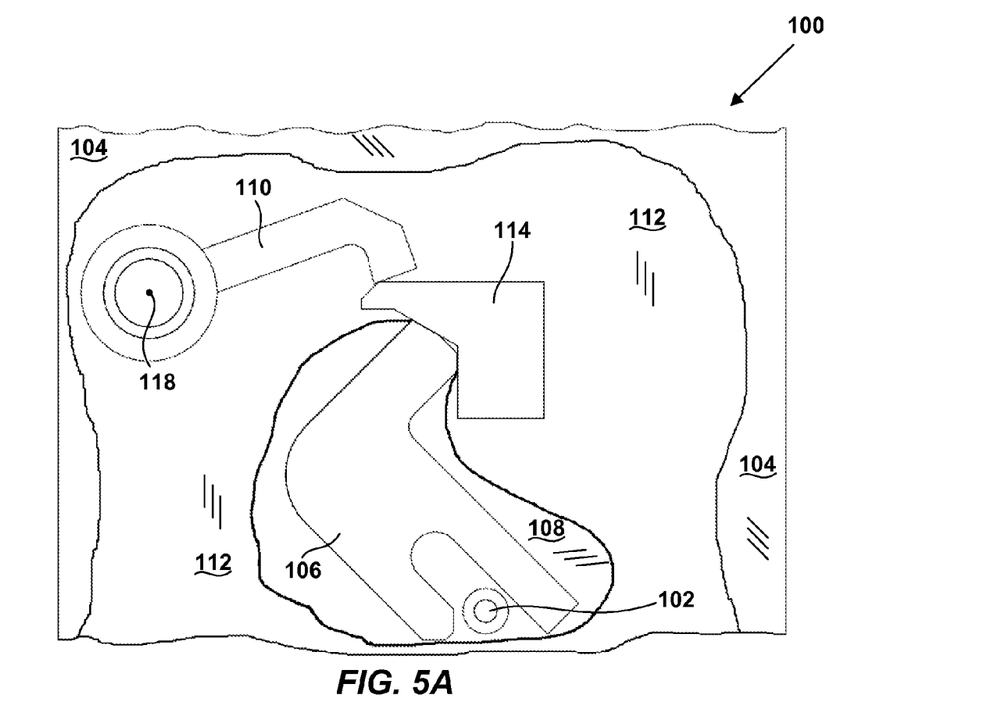
FIG. 5A is a front cutaway section view of a portion of an example of a locking mechanism according to the present disclosure in a partially extended condition.
Figure 5B:
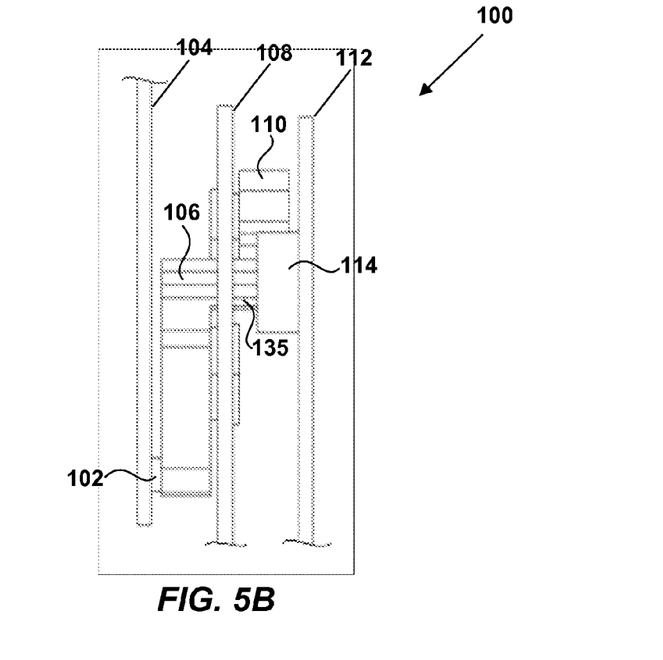
FIG. 5B is a right side view of the locking mechanism of FIG. 5A.

FIGS. 5A and 5B, with continued reference to FIGS. 2-9, depict a condition where the first panel section 104 is positioned in at least a partially extended position relative to the second panel section 108, such that the stud 102 is caused to engage the lower pawl 106 upon the first panel section 104 moving a first distance relative to the second panel section 108. For example, as tension is applied to a mast winch rope (as one example of an actuating mechanism or system within the telescoping structure), the first panel section 104 extends and the stud caused to engage the slot portion 134 of the lower pawl 106 on the second panel section 108. Further extension of the first panel 104 relative to the second panel section 108 causes the stud 102 to fully engage the lower pawl 106, and to rotate the lower pawl 106, such that the latch portion 135 of the lower pawl 106 begins to release or disengage from the lock wedge 114. With the first panel section 104 extended sufficiently, the lower pawl 106 is caused to disengage fully from the lock wedge 114, wherein it is subsequently positioned to then engage the upper pawl 110.

Figure 6A:
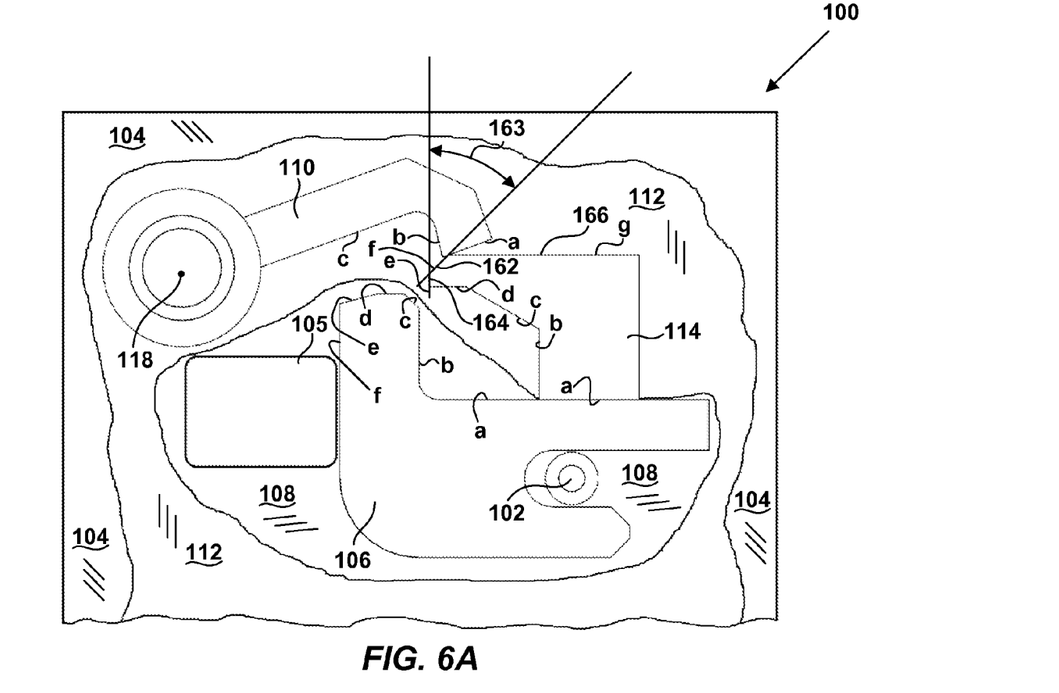
FIG. 6A is a front cutaway section view of a portion of an example of a locking mechanism according to the present disclosure in a further partially extended condition in comparison to that of FIG. 5A.
Figure 6B:
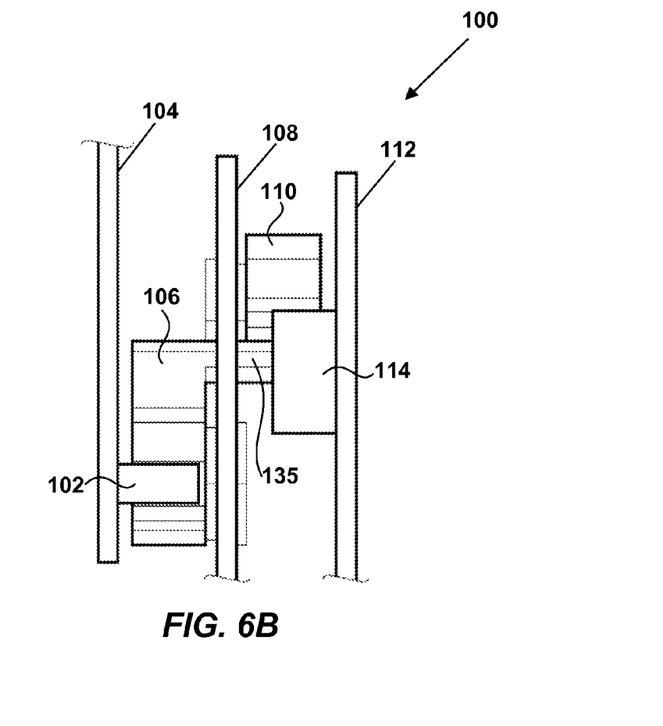
FIG. 6B is a right side view of the locking mechanism of FIG. 6A.

The lower pawl 106 is caused to disengage from the lock wedge 114 upon the stud 102 engaging the lower pawl 106 and the first panel section 104 extending a second distance. As shown in FIG. 6A, the lower pawl 106 is rotatable away from the lock wedge 114 until coming in contact with a stop block 105 fixed to the second panel section 108, the stop block 105 operating to prevent further rotation of the lower pawl 106. In this position, the stud 102 can be positioned within the slot portion 134 as shown in FIG. 6A (positioned towards the closed end of the slot portion). As described below, further extension of the first panel section 104 will function to cause the lower pawl 106 to engage the upper pawl 110, thus facilitating extension of the second panel section 108 (along with the continued movement of the first panel section 104). With the stud 102 engaged with the lower pawl 106 in a locked condition, the upper pawl 110 can be engaged by the lower pawl 106. Moreover, the upper pawl 110 can be configured to prevent opposite rotation of the lower pawl 106 and the disengagement of the stud 102 from the lower pawl 106. As such, the first panel section 104 can be locked in place relative to the second panel section 108. Indeed, the first panel section 104 can be locked in place relative to the second panel section 108 upon the upper and lower pawls 106, 110 being engaged with one another.

Figure 7A:
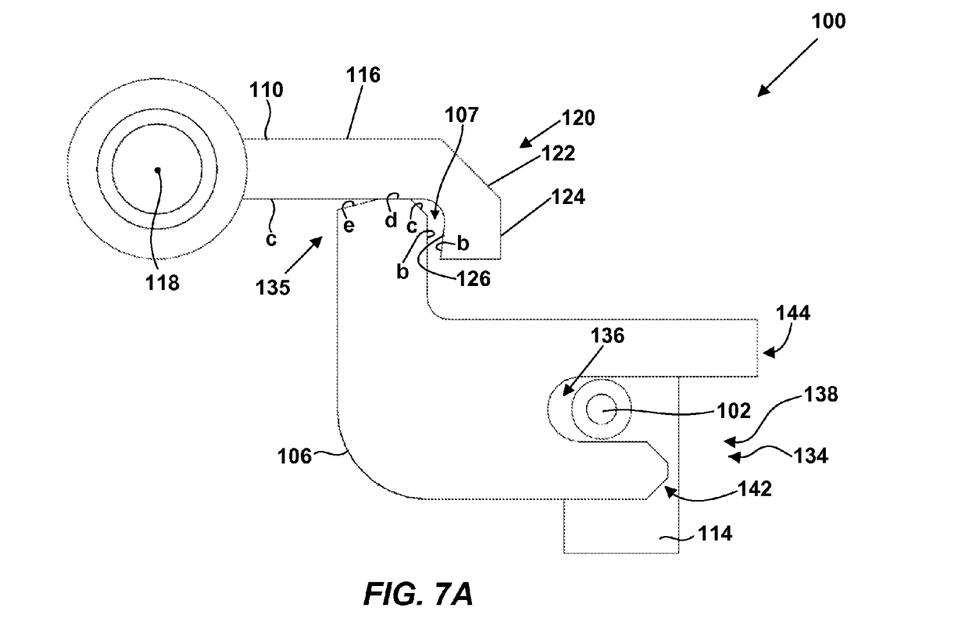
FIG. 7A is a front cutaway section view of a portion of an example of a locking mechanism according to the present disclosure in a further partially extended condition in comparison to that of FIG. 6A.
Figure 7B:
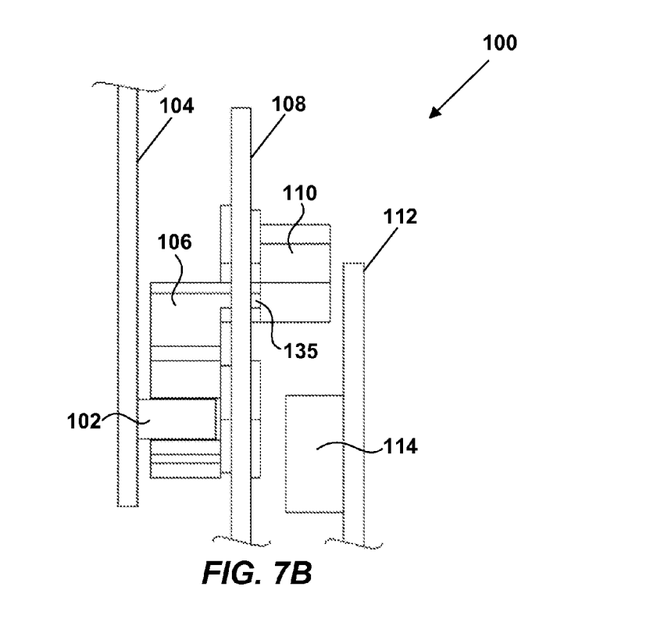
FIG. 7B is a right side view of the locking mechanism of FIG. 7A.

In the condition with the second panel section 108 locked with the first panel section 104, the second panel section 108 can be caused to move with the first panel section 104 relative to the third panel section 112 upon further actuation of the telescoping structure to extend the panel sections. Indeed, the upper pawl 110 disengages or can be caused to disengage from the lock wedge 114 upon the second panel section 108 moving relative to the third panel section 112 and the lower and upper pawls 106, 110 being engaged with one another. In this arrangement, the second panel section 108 can be extended (along with the continued movement of the first panel section 104) to a fully extended position, with the third panel section 112 remaining still as the last panel section. FIGS. 7A and 7B depict a condition in which the second panel section 108 is positioned a distance away from the third panel section 112 (the upper and lower pawls 106, 110 being released from the lock wedge 114). It is noted that FIGS. 7A and 7B show the components without the panel sections, however, it is to be understood that the panel sections are present, just hidden from view.

As can be seen, the locking mechanism 100 facilitates sequential extension of the various panel sections present within the telescoping structure. Although only first, second and third panel section 104, 108, 112 were shown and described in detail in FIGS. 2-9, it is contemplated that a telescoping structure can comprise additional panel sections, such as those illustrated in the telescoping structure 10 of FIGS. 1A-1C, and that similar locking mechanisms can be utilized between the various panel sections to ensure proper, sequential extension/retraction of the panel sections. Additional panel sections and how various additional locking mechanisms can be deployed to be operable with these is explained in more detail below.

Figure 8:
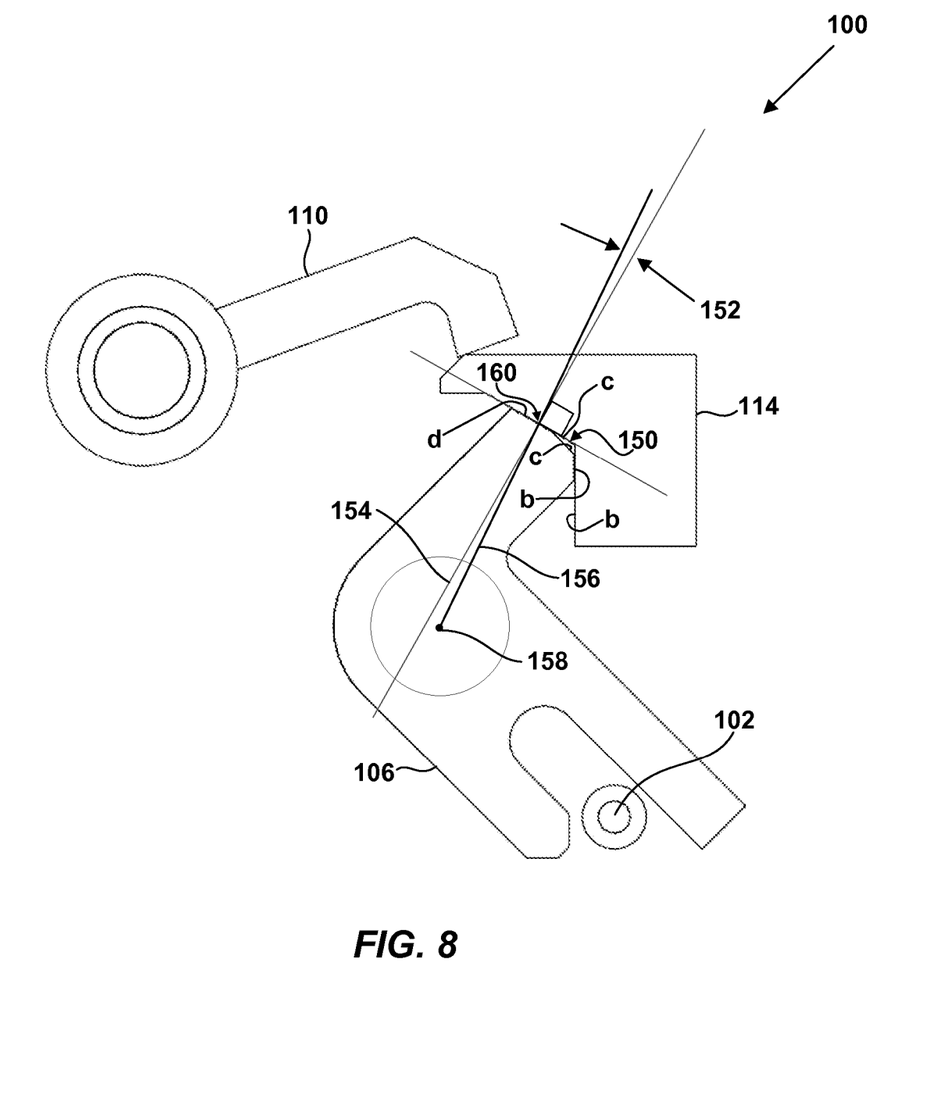
FIG. 8 is a front view of the locking mechanism of FIG. 5A with transparent panel sections.

As shown specifically in FIGS. 6A, 8, and with reference to FIGS. 1-8, the lock wedge 114 and the upper and lower pawls 110, 106, respectively, can further comprise discrete and specifically configured surfaces that interface with one another, and that facilitate proper and enhanced function of the locking mechanism. In one example, the lock wedge 114 can comprise interface surfaces a-g, the lower pawl 106 can comprise interface surfaces a-f, and the upper pawl 110 can comprise interface surfaces a-c (see FIG. 6A). The lower pawl 106 can be configured as shown, with interface surfaces a-f. The upper pawl 110 can be configured as shown, with interface surfaces a-c. The lock wedge 114 can be configured as shown, with interface surfaces a-g. The lower pawl 106 and the lock wedge 114 can engage one another as shown in FIG. 8, such that when interface surfaces b and d of the lower pawl 106 are in contact with and parallel to interface surfaces b and c, respectively, of the lock wedge 114, as shown, an angle 152 between a line 154 normal to the contact surface 150 (interface surface c of lock wedge 114) and a line 156 extending through a pivot point 158 of the lower pawl 106 to a contact point 160 about the contact surface 150 at the junction of interface surfaces c and d of the lower pawl 106 can be between 0 and 7 degrees. This angle 152 provides for smooth operation of the locking mechanism. Angles less than 0 degrees can cause the second and third panel sections to separate from one another slightly as the stud 102 of the first panel section 104 urges the lower pawl 106 into rotation. Angles greater than about 7 degrees can tend to cause the lower pawl 106 to slip out from the lock wedge 114.

Figure 9:
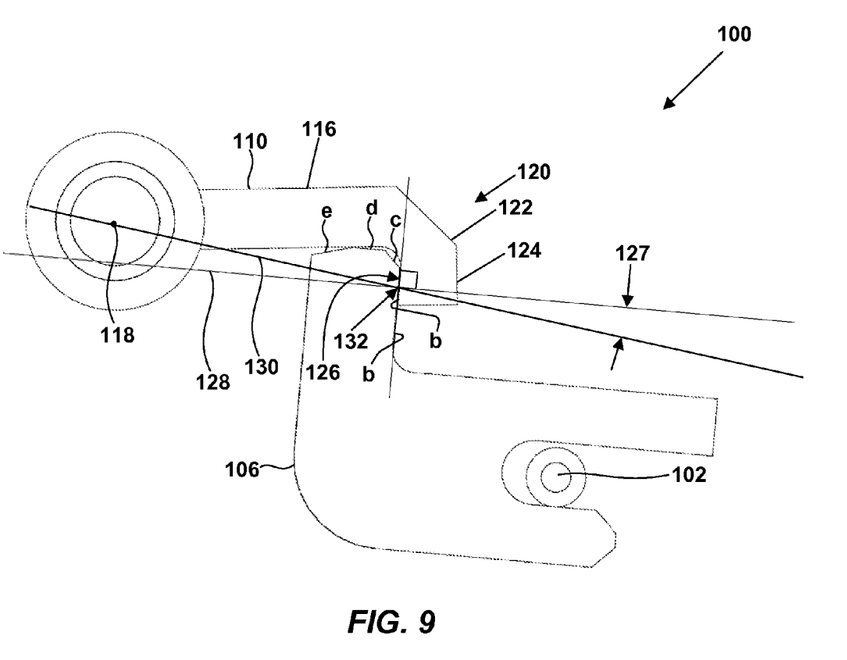
FIG. 9 is a front view of the locking mechanism of FIG. 7A with transparent panel sections in a slightly different condition.

As shown specifically in FIGS. 2, 6A, 7A and 9, and with reference to FIGS. 1-9, the upper pawl 110 includes a body portion 116 extending from a pivot point 118. The pivot point 118 is represented by a point along the axis of rotation 119 (see FIG. 2) about which the upper pawl 110 rotates. The body portion 116 can comprise a free end 120, including a hook portion 122 operable to engage the lock wedge 114 at a terminating end 124 of the hook portion 122, and to engage the lower pawl 106 at an inside hook surface 126 of the hook portion 122 upon the first section being extended and the lower pawl 106 being released from the lock wedge 114. The hook portion 122 can comprise an inside hook surface 126 that can function as a contact or interface surface (e.g., see interface surface b of the upper pawl 110) between the upper pawl 110 and the lower pawl 106. Once released from the lock wedge 114, the lower pawl 106 can rotate slightly (in this case clockwise), such that the latch portion 135 of the lower pawl 106 engages the hook portion 122 of the upper pawl, as shown, wherein the lower pawl 106 is positioned on a slight incline, as shown in FIG. 9. The relative positioning between the upper pawl 110 and the lower pawl 106, as well as the configuration of the hook portion 122 of the upper pawl 110, can be such that the lower pawl 106 is permitted to rotate slightly to engage the upper pawl 110. An angle 127 between a line 128 normal to the contact surface 126 of the upper pawl 110 and a line 130 extending through the pivot point 118 of the upper pawl 110 to a contact point 132 about the contact surface 126 can be between 2 and 10 degrees. The contact point 132 can be located anywhere along the inside hook surface 126 suitable to provide the desired angle 127. Angles approaching zero to negative will tend to try to unlatch the upper pawl 110 from the lower pawl 106 during operation. Angles greater than about 10 degrees will increase the lower pawl 106 rotation angle needed to make contact with the upper pawl 110. This can increase the distance that the first panel section 104 can fall when the first panel section 104 is locked to the second panel section 108, and can increase the required length of the slot 134 in the lower pawl 106 to keep the stud 102 captured.

It is to be understood that the motion of extension of the various panel sections can be reversed with interaction of the features discussed herein. For example, from full extension, the second panel section 108 can be retracted downward relative to the third panel section 112 while locked together with the first panel section 104. It is noted that a small retraction of the first panel section 104 can occur due to the required clearances between parts that ensure reliable operation. For example, note the slight rotation of the lower pawl in FIG. 9 as compared to FIG. 7A. Retraction can continue as the lock wedge 114 and the upper pawl 110 engage one another, thus arresting the retraction of the second panel section 108. Further retraction of the first panel section 104 functions to free the lower pawl 106 from the upper pawl 110, such that the only relative movement is now between the first and second panel sections 104 and 108. Still further retraction causes the lower pawl 106 to rotate into the lock wedge 114 as the downward movement of the first panel section 104 and the stud 102 causes the lower pawl 106 to rotate. This action functions to again lock the second panel section 108 relative to the third panel section 112. Continued retraction of the first panel section 104 relative to the second (and third) panel sections 108, 112 functions to release the stud 102 from the slot portion 134, allowing the first panel section 104 to fully retract while the second panel section 108 is locked to the third panel section 112.

The lock wedge 114 can include a chamfer 162 formed between an upper surface 166 and a side surface 164 of the lock wedge 114. The chamfer 162 is defined by an angle 163 from about 30 to 45 degrees as measured from the side surface 164. Upon retraction of the second panel section 108 toward the third panel section 112, and with the lower pawl 106 in a position as shown in FIG. 9, the latch portion 135 of the lower pawl 106 can be caused to contact the lock wedge 114 at the chamfer 162 which can then urge the lower pawl 106 into a slight rotation away from the hook portion 122 of the free end 120 of the upper pawl 110 during retraction of the lower pawl 106 past the lock wedge 114.

It is to be understood that the various components can be scaled up or down based on specific structure strength requirements.

An example of a locking system for a telescoping structure 10 includes a first panel section 104 having a stud 102 fixed thereto, a second panel section 108 having a lower pawl 106 and an upper pawl 110 coupled thereto, and a third panel section 112 having a lock wedge 114 coupled thereto. The lower pawl 106 is operable to engage the stud 102, and the upper pawl 110 is operable to engage the lower pawl 106. The lock wedge 114 is operable to engage the upper and lower pawls 110, 106. In a retracted position of the telescoping structure 10, the lower pawl 106 is engaged with the lock wedge 114, such that the second panel section 108 is locked in place relative to the third panel section 112, and the first panel section 104 is free to move relative to the second panel section 108. Additional panel sections can be included within the locking system and the telescoping structure, each of these comprising one or more components of a locking mechanism, such as described above, to facilitate sequential extension and retraction of the various panel sections within the locking system and telescoping structure.

Figure 10A:
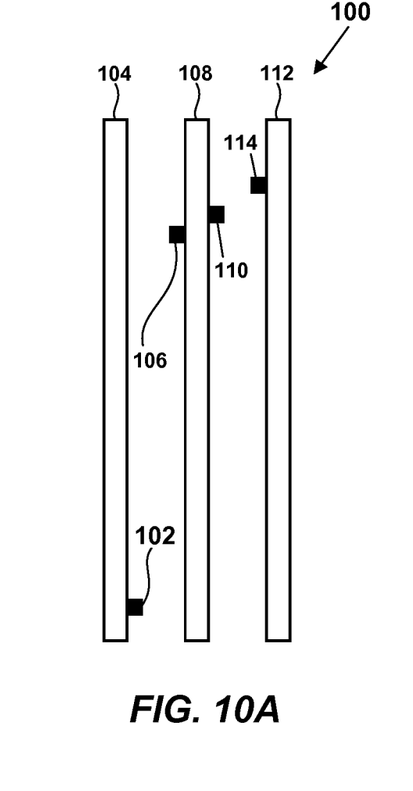
FIG. 10A is a schematic representation of an example of a three panel locking mechanism according to the present disclosure.

Examples of the passive locking mechanism 100 as described herein can have three or more panel sections. The locking mechanism includes a repeatable design for telescoping structures with three or more panel sections. For illustration, FIG. 10A schematically represents a three panel section system 100 similar to that described above, with the first panel section 104 comprising a stud 102, the second panel section 108 comprising upper and lower pawls 106 and 110, and the third panel section 112 comprising a lock wedge 114.

Figure 10B:
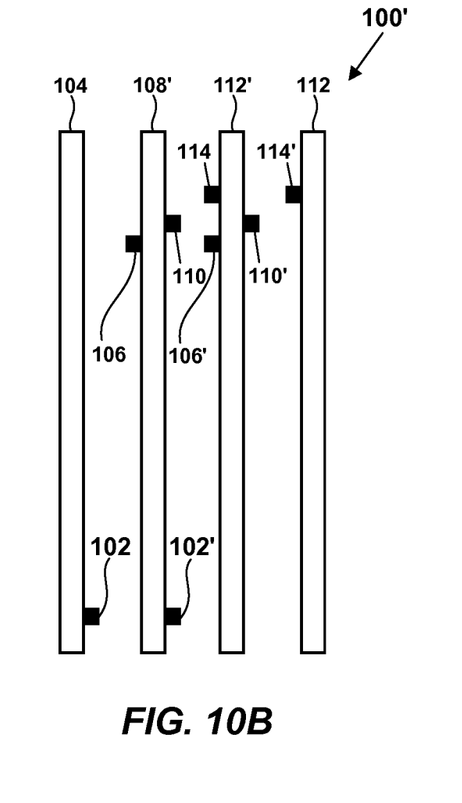
FIG. 10B is a schematic representation of an example of a four panel locking mechanism according to the present disclosure.

In another example, a locking system and associated telescoping structure can have four panel sections as depicted in FIG. 10B. In a four panel system 100', a fourth panel section 112 can include an additional lock wedge 114' coupled thereto. The additional lock wedge 114' can be similar in form and function to the lock wedge 114 coupled to the third panel section 112'. In the four panel locking system 100', the second panel section 108' can comprise an additional stud 102' associated therewith. The additional stud 102' can be similar in form and function to the stud 102 fixed to the first panel section 104. The third panel section 112' can comprise an additional lower pawl 106' and an additional upper pawl 110' coupled thereto. The additional lower and upper pawls 106', 110' can be similar in form and function to the lower and upper pawls 106, 110 coupled to the second panel section 108'. The additional lower pawl 106' can be operable to engage with the additional stud 102', the additional upper pawl 110' can be operable to engage the additional lower pawl 106', and the additional lock wedge 114' can be operable to engage the additional upper and lower pawls 110', 106', all in a similar manner as described herein with respect to the three panel system to facilitate the sequential extension and retraction of a telescoping structure having four panel sections.

Figure 10C:
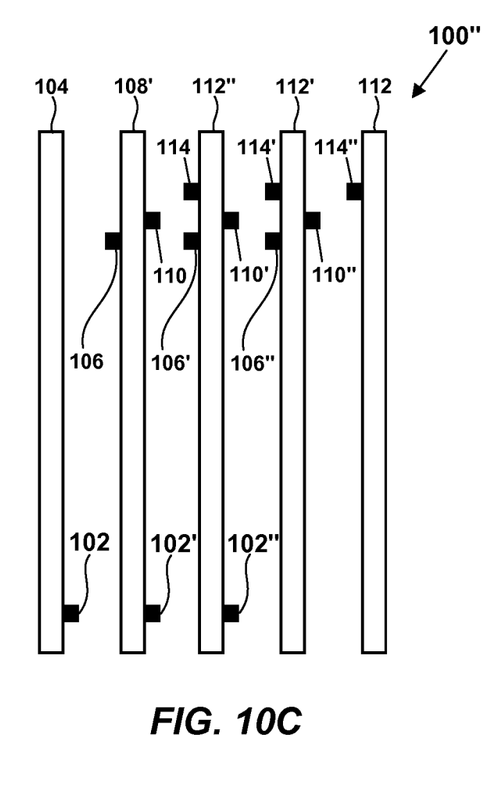
FIG. 10C is a schematic representation of an example of a five panel locking mechanism according to the present disclosure.

In another example, a locking system, such as the four panel system 100' described above, and an associated telescoping structure can further include a fifth panel section. As depicted in FIG. 10C, a five panel system 100" can comprise a fifth panel section 112 with a further additional lock wedge 114" coupled thereto. Similar to the additional (fourth) panel described above, the five panel system 100" can include a third panel section 112" having a further additional stud 102" associated therewith. The fourth panel section 112' can comprise a further additional lower pawl 106" and a further additional upper pawl 110" coupled thereto. The further additional lower pawl 106" can be operable to engage the further additional stud 102", and the further additional upper pawl 110" can be operable to engage the further additional lower pawl 106". The further additional lock wedge 114" can be operable to engage the further additional upper and lower pawls 110", 106", all in a similar manner as described herein with respect to the three panel system to facilitate the sequential extension and retraction of a telescoping structure having five panel sections.

As one skilled in the art will recognize, any number of additional panel sections can be added to the locking system 100" as depicted in FIG. 10C with the corresponding features added to the appropriate panel sections as discussed above. Generally, the third panel section 112" shown in FIG. 10C could be effectively duplicated with each additional panel section added to the system. For example, with a six panel section system, the fourth panel section in the six panel section system would have all of the same components as the third panel section in the six panel section system. It is to be understood that the positioning of the individual components on each panel section can be varied for packaging and convenience. For example, the components (i.e., upper and lower pawls, stud, and lock wedge) can be positioned at any suitable location on the panel section, or even on another surface of the same panel section. The positioning of the components can vary so long as the interaction between the panel sections is provided for and operative as discussed above.

An example of a method for facilitating sequential extension and retraction of a telescoping structure includes providing a stud fixable to a first panel section. The method further includes providing a lower pawl coupleable to a second panel section and providing an upper pawl coupleable to the second panel section. The upper pawl is operable to engage the lower pawl. The method further includes providing a lock wedge coupleable to a third panel section. The lock wedge is operable to engage the upper and lower pawls. The method further includes configuring the stud for engagement with the lower pawl and configuring the lower pawl for engagement with the lock wedge to facilitate locking of the second panel section relative to the third panel section, wherein the first panel section is free to move relative to the second panel section.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A passive locking mechanism for a telescoping structure, comprising:
   a stud fixed to a first panel section;
   a lower pawl coupled to a second panel section;
   an upper pawl coupled to the second panel section, the upper pawl operable to engage the lower pawl; and
   a lock wedge coupled to a third panel section, the lock wedge being operable to engage the upper and lower pawls,
   wherein, in a retracted position of the telescoping structure, the lower pawl is engaged with the lock wedge, such that the second panel section is locked in place relative to the third panel section, and
   wherein the first panel section is free to move relative to the second panel section.

2. The passive locking mechanism of claim 1, wherein the stud is operable to engage the lower pawl upon the first panel section moving a first distance relative to the second panel section.

3. The passive locking mechanism of claim 1, wherein the lower pawl is caused to disengage from the lock wedge upon the stud engaging the lower pawl and the first section extending a second distance, and
   wherein the second panel section is caused to move with the first panel section relative to the third panel section.

4. The passive locking mechanism of claim 1, wherein in the retracted position of the telescoping structure, the upper pawl is engaged with the lock wedge, the lock wedge preventing rotation of the upper pawl.

5. The passive locking mechanism of claim 1, wherein the upper pawl disengages from the lock wedge upon the second panel section moving relative to the third panel section, the lower and upper pawls engaging one another.

6. The passive locking mechanism of claim 1, wherein the upper pawl engages the lower pawl upon the second panel section moving a first distance relative to the third panel, the upper pawl being configured to prevent rotation of the lower pawl and the disengagement of the stud from the lower pawl, thereby locking the first panel section in place.

7. The passive locking mechanism of claim 1, wherein the first panel section is locked in place relative to the second panel section upon the upper and lower pawls being engaged with one another.

8. The passive locking mechanism of claim 1, wherein the upper pawl and the lower pawl are biased toward engagement with the lock wedge.

9. The passive locking mechanism of claim 1, wherein the upper pawl includes a body portion extending from a pivot point, the body portion having a free end including a hook portion, the hook portion for engaging with the lock wedge at a terminating end of the hook portion and for engaging with the lower pawl at an inside hook surface of the hook portion.

10. The passive locking mechanism of claim 9, wherein the hook portion comprises a contact surface, and wherein an angle between a line normal to the contact surface and a line extending through the pivot point of the upper pawl to a contact point about the contact surface is between 2 and 10 degrees.

11. The passive locking mechanism of claim 1, wherein the lock wedge comprises a contact surface, and wherein an angle between a line normal to the contact surface and a line extending through a pivot point of the lower pawl to a contact point about the contact surface is between 0 and 7 degrees.

12. The passive locking mechanism of claim 1, wherein the lower pawl comprises a slot portion operable to receive and engage the stud, and a latch portion operable to engage the upper pawl and the lock wedge, the slot having an open and closed ends, and being defined by first and second wall portions having different lengths.

13. The passive locking mechanism of claim 1, wherein the lock wedge comprises a chamfer formed between an upper surface and a side surface, the chamfer being from about 30 to 45 degrees as measured from the side surface.

14. A locking system for a telescoping structure, comprising:
   a first panel section having a stud fixed thereto;
   a second panel section having a lower pawl and an upper pawl coupled thereto, the lower pawl operable to engage the stud, the upper pawl operable to engage the lower pawl;
   a third panel section having a lock wedge coupled thereto, the lock wedge being operable to engage the upper and lower pawls,
   wherein, in a retracted position of the telescoping structure, the lower pawl is engaged with the lock wedge, such that the second panel section is locked in place relative to the third panel section, and
   wherein the first panel section is free to move relative to the second panel section.

15. The locking system of claim 14, further comprising a fourth panel section, the fourth panel section having an additional lock wedge coupled thereto, and
   wherein, the second panel section has an additional stud fixed thereto, and
   wherein, the third panel section has an additional lower pawl and an additional upper pawl coupled thereto, the additional lower pawl operable to engage the additional stud, the additional upper pawl operable to engage the additional lower pawl, and
   wherein, the additional lock wedge is operable to engage the additional upper and lower pawls.

16. The locking system of claim 15, further comprising a fifth panel section, the fifth panel section having a further additional lock wedge coupled thereto, and
   wherein, the third panel section has a further additional stud fixed thereto, and
   wherein, the fourth panel section has a further additional lower pawl and a further additional upper pawl coupled thereto, the further additional lower pawl operable to engage the further additional stud, the further additional upper pawl operable to engage the further additional lower pawl, and
   wherein, the further additional lock wedge is operable to engage the further additional upper and lower pawls.

17. A method for facilitating sequential extension and retraction of a telescoping structure, comprising:
   providing a stud fixable to a first panel section;
   providing a lower pawl coupleable to a second panel section;
   providing an upper pawl coupleable to the second panel section, the upper pawl operable to engage the lower pawl;
   providing a lock wedge coupleable to a third panel section, the lock wedge being operable to engage the upper and lower pawls;
   configuring the stud for engagement with the lower pawl;
   configuring the lower pawl for engagement with the lock wedge to facilitate locking of the second panel section relative to the third panel section, wherein the first panel section is free to move relative to the second panel section.

* * * * *

UNITED STATES PATENT AND TRADEMARK OFFICE
CERTIFICATE OF CORRECTION

PATENT NO. : 10,113,573 B2  
APPLICATION NO. : 14/933979  
DATED : October 30, 2018  
INVENTOR(S) : Steven P. Kemp et al.

Page 1 of 1

It is certified that error appears in the above-identified patent and that said Letters Patent is hereby corrected as shown below:

On the Title Page

Item [54] and in the Specification, Column 1 Line 1-2, delete "SEQUENCING LOCKING MECHANISM FOR TELESCOGING STRUCTURES" and insert --SEQUENCING LOCKING MECHANISM FOR TELESCOPING STRUCTURES--

Signed and Sealed this  
Fifth Day of March, 2019

Andrei Iancu  
*Director of the United States Patent and Trademark Office*